US008250717B2

(12) United States Patent
Boone

(10) Patent No.: US 8,250,717 B2
(45) Date of Patent: Aug. 28, 2012

(54) BONDING CLIP

(75) Inventor: Jeffrey Boone, King of Prussia, PA (US)

(73) Assignee: OBO Bettermann of North America, King of Prussia, PA (US)

( * ) Notice: Subject to any disclaimer, the term of this patent is extended or adjusted under 35 U.S.C. 154(b) by 511 days.

(21) Appl. No.: 12/533,929

(22) Filed: Jul. 31, 2009

(65) Prior Publication Data

US 2010/0095492 A1    Apr. 22, 2010

Related U.S. Application Data

(60) Provisional application No. 61/085,138, filed on Jul. 31, 2008.

(51) Int. Cl.
  *F16L 3/08*  (2006.01)
  *F16L 3/22*  (2006.01)
  *H01R 13/648*  (2006.01)
  *H01R 4/48*  (2006.01)
  *H01R 4/64*  (2006.01)
(52) U.S. Cl. .............. 24/514; 24/564; 24/569; 248/74.1
(58) Field of Classification Search .................. 24/487, 24/514, 564, 521, 525, 569; 248/74.1, 74.4, 248/68.1
See application file for complete search history.

(56) References Cited

U.S. PATENT DOCUMENTS

| 719,579 | A | * | 2/1903 | Friesen | 24/521 |
| 1,051,245 | A | * | 1/1913 | Marchal | 24/329 |
| 1,710,627 | A | * | 4/1929 | Keethes | 24/521 |
| 3,824,654 | A | * | 7/1974 | Takabayashi | 24/487 |
| 5,653,003 | A | * | 8/1997 | Freeman | 24/487 |
| 5,938,666 | A | * | 8/1999 | Reynolds et al. | 606/120 |
| 5,996,593 | A | * | 12/1999 | Horman | 132/278 |
| 2005/0040295 | A1 | | 2/2005 | Sinkoff | |

FOREIGN PATENT DOCUMENTS

EP      0 848 450 A1    6/1998
WO    WO 2010/014951    2/2010

OTHER PUBLICATIONS

International Search Report and Written Opinion in PCT/US2009/05248, mailed May 6, 2011 (7 pages).

* cited by examiner

*Primary Examiner* — Robert J Sandy
(74) *Attorney, Agent, or Firm* — Dinsmore & Shohl, LLP

(57) ABSTRACT

A bonding clip formed of a metal and having unitary or multi-part construction is used to electronically bond together wires of adjacent wire mesh cable trays. The bonding clip binds the wire mesh cable trays by penetrating the protective coating one the wire mesh cable trays with teeth-like projections in order to permit conductive contact between the wires. The bonding clip has a profile that permits maintenance of the cross-sectional area formed by the wires of the wire mesh cable trays.

20 Claims, 8 Drawing Sheets

A

B

BONDING CLIP

This application claims the benefit of U.S. Provisional Patent Application No. 61/085,138, filed on Jul. 31, 2008, the entire disclosure of which is hereby incorporated by reference, in its entirety, as if set forth fully herein.

The invention relates generally to cable tray bonding clips and, in particular, to wire mesh cable tray bonding clips.

Generally, a cable tray system is a rigid structural support system used to mechanically support cables and wires across open spans. One type of cable tray is a wire mesh cable tray. Typically, wire mesh cable trays are used at a job site for field adaptable support systems for low voltage, telecommunication and fiber-optics cables and are installed on short support spans between about four to about eight feet.

Wire mesh cable trays are formed by a wire structure, generally of metal. They comprise longitudinal wires known as "warp" wires, that run longitudinally, and transverse wires known as "weft" wires, that run perpendicular to the warp wires. The warp and weft wires are welded or otherwise permanently connected to one another at their points of contact to form a U-shaped tray having a bottom and two lateral sides in which the upper parts of the sides terminate in a longitudinal edge wire and the ends of each tray may terminate in a substantially U-shaped edge wire or wires, and, in some embodiments, individual longitudinal wires along the sides and bottom of a tray may extend beyond the terminal transverse edge wire at one or both of the tray ends. Wire mesh cable trays have standard widths of 2, 4, 6, 8, 12, 16, 18, 20 and 24 inches, standard depths of 1, 2 and 4 inches, and a standard length of about 118 inches.

Typically, wire mesh cable trays are interconnected in series in an end to end configuration. In some embodiments, the terminal transverse edge wires at the tray ends are interconnected, while in other embodiments, the interconnections are made between the terminal transverse edge wires and one or more of terminal extending longitudinal wires, or both. The intersections between adjacent wire mesh cable trays are created manually on the job when a cable tray run is assembled for use and affixed to a building structure, using an array of different brackets and clamps that are known in the art. In some instances, wire cutters are used to adjust or correct for any undesirable wire overlap. A series of two or more wire mesh cable trays can be installed in any possible position over a given length of run, wherein the positions of each span of cable tray may be parallel, perpendicular or at an angle relative to a fixed building structural feature such as a wall, ceiling or floor.

Wire mesh cable tray units are typically formed of steel wire mesh that is zinc plated, or otherwise treated or coated to render a surface that is resistant to corrosion and is not electrically conductive. In some common embodiments, wire mesh cable trays are first formed from steel and then hot dipped, or coated, by galvanization. Current applicable codes, including the National Electric Code ("NEC"), require that all wire mesh cable trays be conductively connected for purposes of grounding. These code requirements impose the need for the presence of an Equipment Ground Conductor with industry standard ground fault protections of specific ampere ratings. In some circumstances, cable trays may be used as Equipment Ground Conductors if they meet the NEC and/or other applicable industry and regulatory requirements. Moreover, NEC and other applicable industry and regulatory requirements establish a minimum cross sectional area of metal that must be in contact between adjacent cable trays in order to meet the Equipment Ground Conductor requirements.

Conventional brackets and clamps used for connecting wire mesh cable tray units typically encase the coated wires and do not provide electrical connectivity between the units. Indeed, in many instances, such connecting brackets and clamps further impede electrical connectivity between the units. Thus, the devices known and used in the art are not sufficient for fulfilling the desirable function of enabling electrical conductivity along runs of wire mesh cable tray systems. Therefore, there is a need for a suitable connector for wire mesh cable trays that ensures a stable mechanical union between adjacent trays and also enables electrical connectivity between adjacent wire mesh cable tray units and along complete cable tray runs.

BRIEF SUMMARY OF THE INVENTION

In various embodiments, the invention provides bonding clips for interconnection of wire mesh cable trays to enable the assembly of a run of wire mesh cable tray units that conforms to the rigorous code requirement of continuous grounding. The bonding clips affix to and encase the weft wires of adjacent wire mesh cable tray units, retaining the units in stable and non-pivotal contact while rendering the contact surfaces of the encased weft wires at least partially free of any protective coating so as to permit conductivity between the adjacent wire mesh cable tray units. Thus, in various embodiments, the bonding clips enable the assembly of wire mesh cable tray runs that are electrically conductive at the points of contact between adjacent wire mesh cable tray units to ensure proper grounding.

The bonding clips are configured to be positioned on the weft wires at any of the areas between the longitudinal warp wires along any of the side and the bottom portions of the U-shaped form of adjacent wire mesh cable tray units. The bonding clips have an essentially flat profile such that when affixed to weft wires of adjacent cable trays, the bonding clips fit within the cross sectional area of the side or bottom portion to which they are affixed, and do not extend into the gutter space; thus, the bonding clips do not appreciably alter the cross-sectional area of metal at the interface between adjacent tray units, and they do not extend within the gutter space so as to not interfere with any cables that may be placed therein when the assembled wire mesh cable tray run is in use.

The bonding clips of the invention are configured to encase a portion of the weft wires of adjacent wire mesh cable tray units at a position along either of the sides or the bottom of the U-shaped form. The bonding clips have opposing faces, each with an interior wire contact surface, and each with an external tray surface, and contact and affix to the weft wires of adjacent cable trays to surround and encase contacted surfaces of the wires. At least one of each of the opposing interior wire contact surfaces of the bonding clips is formed with a plurality of teeth-like projections and the opposing interior wire contact surfaces, when positioned on the wires, are configured for opposing interaction such that the teeth-like projections penetrate and partially strip any protective coating on the surface of the encased wires.

The bonding clips are fixed in place with one or more fastener elements, and in some embodiments the bonding clips or the one or more fastener elements can include a grounding lug for use in large ampere applications. In various embodiments, the bonding clips comprise on at least their external tray surfaces anti-corrosive treatment or coating such that the cable tray runs assembled with the bonding clips retain an overall surface property that is resistant to corrosion and electrical conductivity.

Other features of the embodiments of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIG. 1a illustrates a cable tray known in the art and a bonding clip according to an embodiment of the present invention affixed and joining two adjacent wire mesh cable tray units, wherein the bonding clip is affixed between longitudinal wires along one of the side walls of the tray system;

FIG. 1b further illustrates the bonding clip of FIG. 1a;

DETAILED DESCRIPTION

In the following detailed description of the embodiments, reference is made to the accompanying drawings that form a part hereof, and in which are shown by way of illustration, and not by way of limitation, specific embodiments in which the invention may be practiced. It is to be understood that other embodiments may be utilized and that logical, mechanical and electrical changes may be made without departing from the spirit and scope of the present invention.

The invention provides bonding clips for interconnection of wire mesh cable trays to enable the assembly of a run of wire mesh cable tray units that conforms to the rigorous code requirement of continuous grounding. The bonding clips affix to and encase the weft wires of adjacent wire mesh cable tray units, retaining the units in stable and non-pivotal contact while rendering the contact surfaces of the encased weft wires at least partially free of any protective coating so as to permit conductivity between the adjacent wire mesh cable tray units. Thus, in various embodiments, the bonding clips enable the assembly of wire mesh cable tray runs that are electrically conductive at the points of contact between adjacent wire mesh cable tray units to ensure proper grounding.

Figure 1:
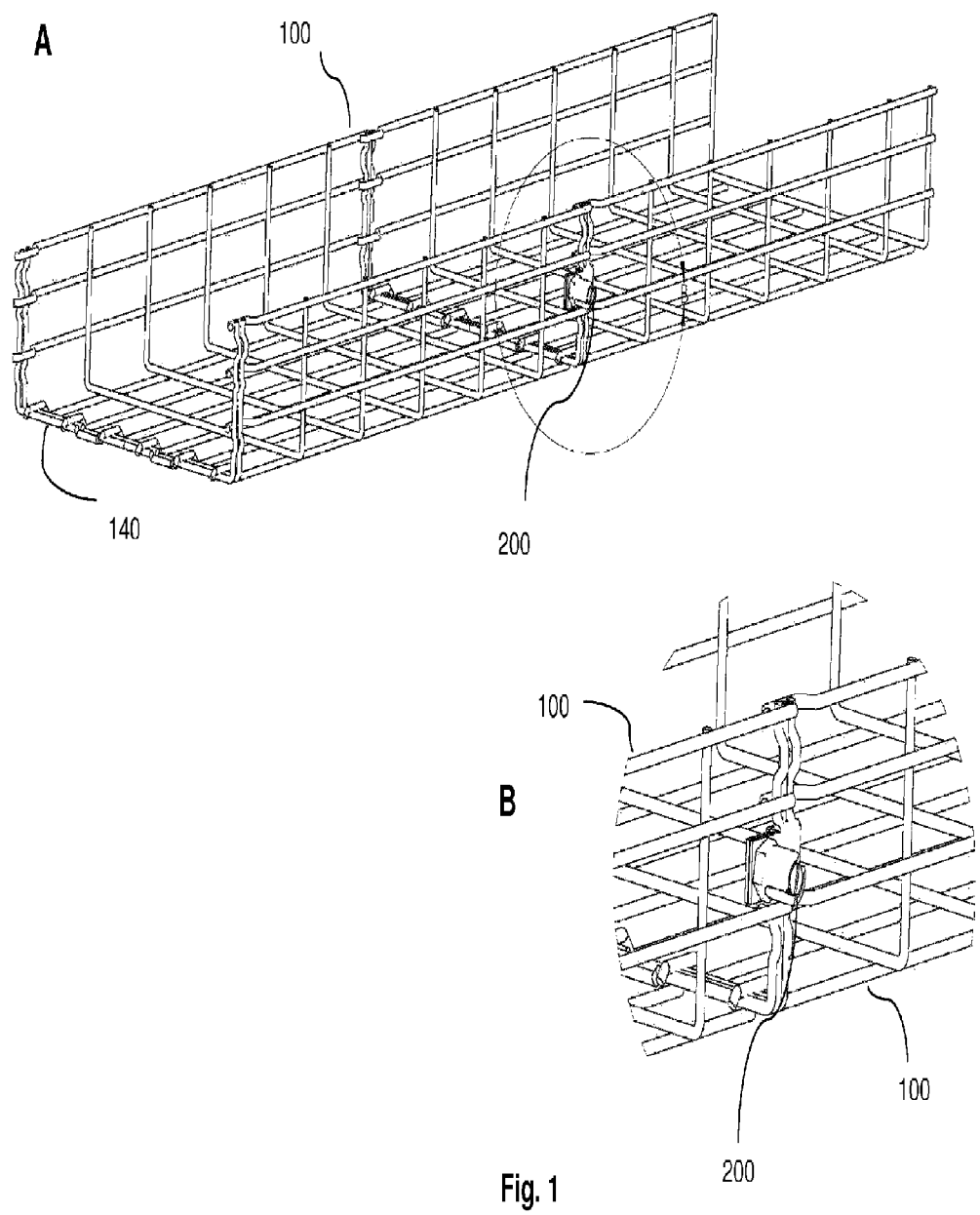

As shown in FIG. 1A, a wire mesh cable tray unit 100 is comprised of longitudinal wires, also known as "warp" wires, that run longitudinally, and transverse wires, also called "weft" wires, that run perpendicular to the warp wires, wherein the warp and weft wires are welded or otherwise permanently connected to one another to form a U-shaped tray. A unit 100 may be of any suitable length, and adjacent units may be connected to each other during assembly on the job site by cutting off wire segments, as necessary, and clamping the units together.

The illustrated tray unit has one form of design that varies from other trays in that the tray units ends terminate in a substantially U-shape, and wherein one end has a single transverse edge wire, while the other end has a pair of transverse edge wires. In addition, according to the depicted cable tray unit, an array of individual longitudinal wires extend beyond the transverse edge wires along the sides and bottom each unit. The wire mesh cable tray units are thus adapted for overlapping between the a singled transverse edge wire end of one unit and the double transverse edge wire end of a second unit so that the transverse edge wires and the extended longitudinal wires interfit to achieve a quick snap locking joint. Of course it will be understood that the illustrated cable tray unit is suitable for use with the connector clips of the instant invention; however, other wire mesh cable tray configurations are known in the art, and thus, other cable trays may be utilized. For purposes of the description and examples provided herein, reference to cable trays will include all possible cable tray configurations, though the illustrated cable trays will be of the configuration as shown in FIG. 1A.

Referring now to FIG. 2a(A)-2e(B), shown are alternate embodiments of the bonding clip 200 of the instant invention. Generally, a bonding clip 200 is configured to be positioned on the weft wires of a wire mesh cable tray unit 100 at any of the areas between the longitudinal warp wires along any of the side and the bottom portions of the U-shaped form of adjacent wire mesh cable tray units 140 (see indicated optional positions for attachment between tray units).

Referring now to FIG. 1B, an assembly of two wire mesh cable tray units is shown with a bonding clip 200 affixed to the side portion of a tray unit 100. The affixed bonding clip 200 is shown from an exterior perspective of the tray assembly. As can be readily seen, the bonding clip 200 has an essentially flat profile, such that when affixed to weft wires of adjacent cable trays, the bonding clip 200 fits within the cross sectional area of the side or bottom portion to which it is affixed. As can also be seen, the bonding clip 200 does not extend into the gutter space and will, thus, not interfere with any cables that may be placed therein when the assembled wire mesh cable tray run is in use. The profile of the bonding clip 200 is thus desirable in that it also reduces the possibility that any cable positioned in the tray that may pass over an intersection between try units will catch or snag on a bonding clip 200.

Referring again to FIG. 2a(A)-2e(B), each depicted bonding clip 200 is configured to encase a portion of the weft wires of adjacent wire mesh cable tray units. The bonding clip 200 can be formed of one piece mounting, according to the alternate embodiments shown in FIG. 2a(A)-2c(B). In yet other embodiments, the bonding clip 200 can be formed of two, three or more pieces. FIG. 2d(A)-2e(B) show alternate views of an embodiment of the bonding clip 200, wherein the bonding clip 200 is formed of two pieces. It will be readily apparent to one of skill in the art that construction of the alternate embodiments can be achieved by a variety of means, including, but not limited to casting or stamping.

Referring again to the alternate embodiments shown in FIG. 2a(A)-2c(B), the depicted bonding clips 200 are of unitary construction, and are formed into a clamp shape having two opposing arms 220 and 240 that define between them an elongated slot 260. Each arm 220 and 240 of a bonding clip 200 has opposing interior faces with a wire receiving portion 280 for contacting and retaining inserted wires by compression between the opposing arms 220 and 240 and with a fixation portion 290 for receiving a fastener to lock the bonding clip 200 into compressive engagement with the wires of adjacent wire mesh cable tray units. Each arm 220 and 240 of a bonding clip 200 also has an external tray surface. The bonding clip 200 can be used on most any type of wire mesh cable tray, and one of ordinary skill in the art would appreciate that the bonding clip 200 could be adapted to retain wires of wire mesh trays having wire diameters that are known and commonly used in the art.

In use, a bonding clip 200 is slipped over adjacent weft wires of adjacent tray units such that the adjacent wires are in at least partial contact with one another and are positioned within the wire receiving portion 280 of the elongated slot 260. When the opposing arms 220 and 240 are moved toward one another, they contact a portion of the surfaces of the wires and by compression affix to the weft wires of adjacent cable trays to surround and encase contacted surfaces of the wires.

At least one of each of the opposing interior faces of the arms 220 and 240 of a bonding clip 200 has a plurality of teeth-like projections 300 in the receiving portion 280. When the bonding clip 200 is positioned on the wires of the adjacent tray units and compressive force is applied to move the arms 220 and 240 together, the opposing interaction between the arms 220 and 240 causes the teeth-like projections 300 to penetrate and partially strip any protective coating on at least a portion of the surface of the wires encased within the receiving portion 280.

In use, the bonding clip 200 is configured with the teeth-like projections 300 to penetrate through the galvanized coating of the wires of the wire mesh cable trays to thereby form a physical connection between the untreated metal of the wire mesh of each tray unit and the bonding clip 200. This compressive attachment and contact provides for a stable and not-pivotal connection between the wire mesh cable tray units, and for embodiments wherein a conductive connection is desirable, the direct contact between the encased wires and the bonding clip 200 effectively jumpers the two wire mesh cable trays together.

According to various embodiments, bonding clips 200 may be secured in a closed configuration and fixed in place with one or more fastener elements. According to one such embodiment, a bonding clip 200 can be bolted into place using a standard bolt and locking nut according to fasteners well known in the art. FIG. 2a(A)-2d(B) show alternate embodiments of the bonding clip 200 with a stud or bolt inserted through one of corresponding receiving apertures in the fixation portion 290 of the opposing arms 220 and 240. FIGS. 1a and 1b illustrate the bonding clip 200 fully attached and bonded to a couple of wire mesh cable trays. It will be readily appreciated that a very wide variety of fasteners are known and can be used to secure the bonding clip 200, and that receiving structures on the bonding clip 200 may be introduced so as to permit attachment of the fasteners therewith. Examples of alternate fasteners include, but are not limited to, any of a variety of clips, rivets, sockets, ties, rings, keys, hoks, screws, bolts, and pins, and other suitable fasteners known in the art.

In some embodiments the bonding clips 200 or the one or more fastener elements, or combinations thereof, can include a grounding element or device, such as a grounding lug, which may be particularly useful for large ampere applications.

In various embodiments, the bonding clips 200 comprise on at least their external surfaces one or more anti-corrosive treatments or coatings such that the cable tray runs assembled with the bonding clips retain an overall surface property that is resistant to corrosion and electrical conductivity, while in some embodiments thereof the interior contact surfaces of the receiving portions 280 of the bonding clips 200 permit conductivity therewith and between affixed adjacent wire mesh cable tray units.

The bonding clip 200 can be comprised of metal, such as, for example, steel, or any other suitable conductive or non-conductive material. For purposes of providing cable tray systems that can serve as Equipment Grounding Conductors, the wire mesh cable tray units are comprised of conductive materials.

Figure 2:
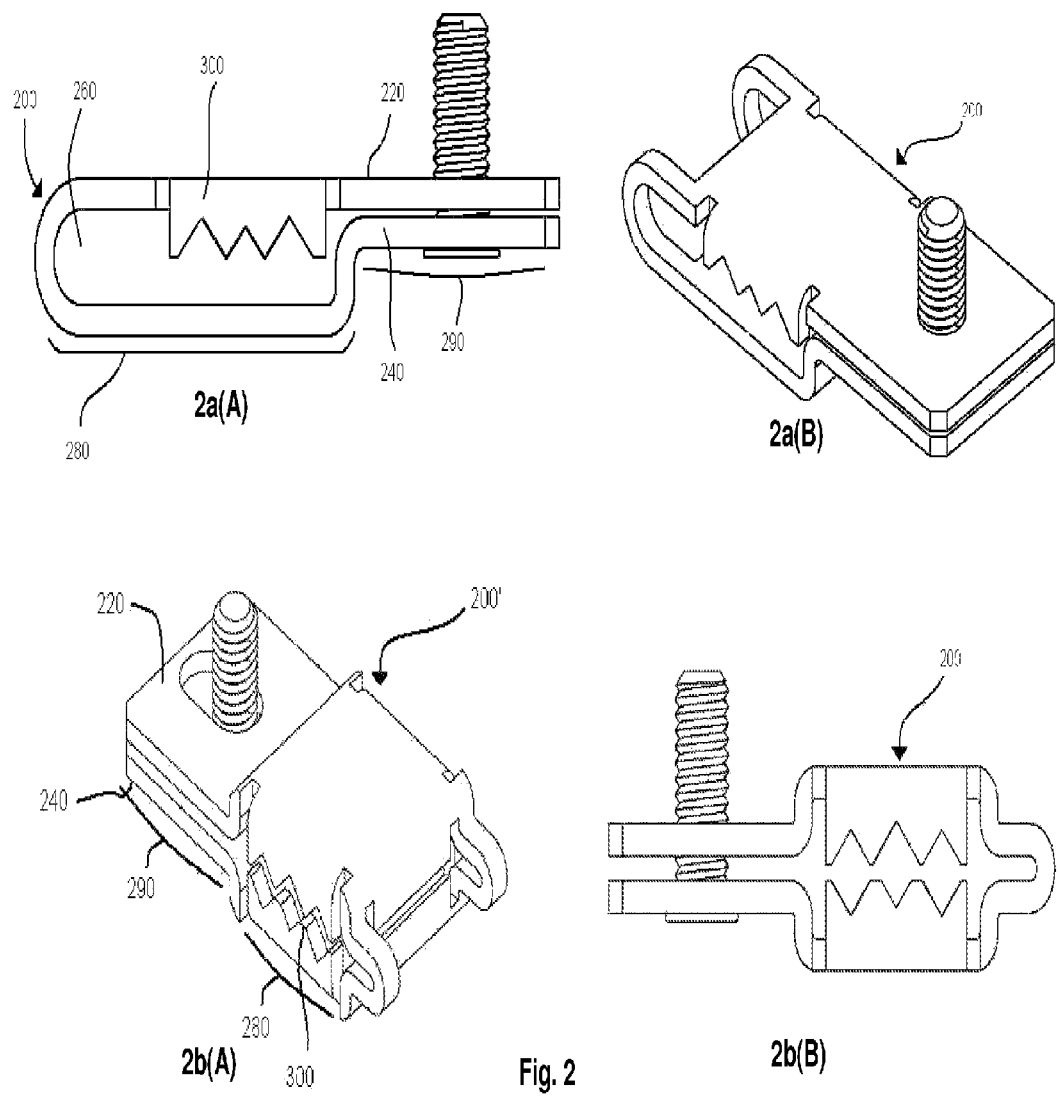
FIG. 2a(A)-e(B) illustrate alternate embodiments of the bonding clip.
Figure 2:
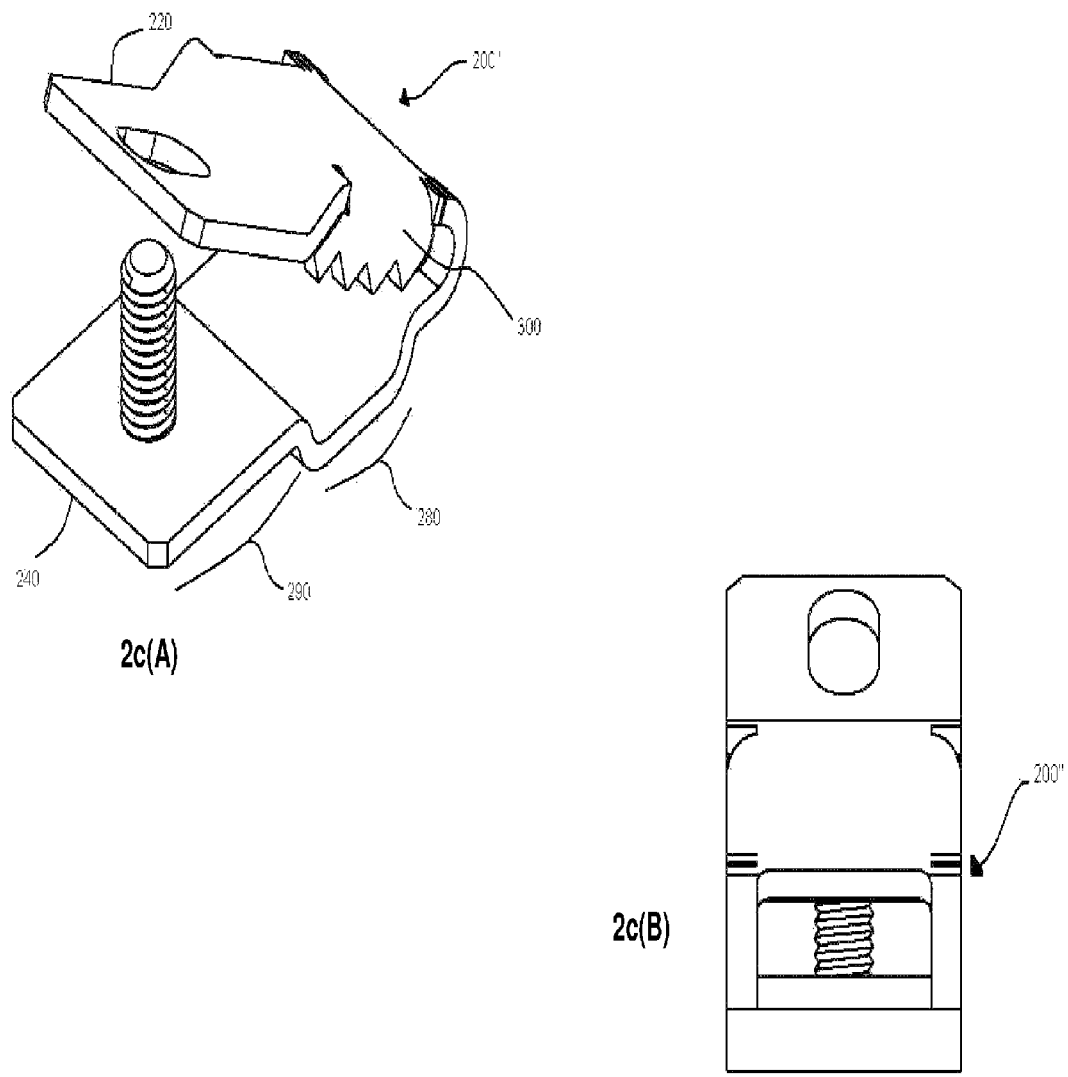
Figure 2:
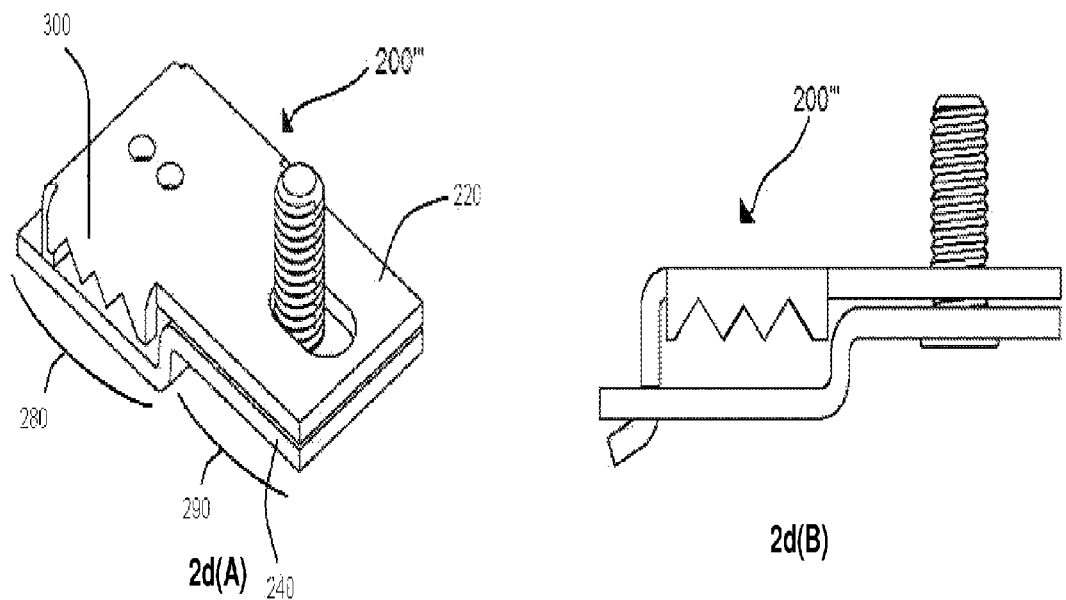
Figure 2:
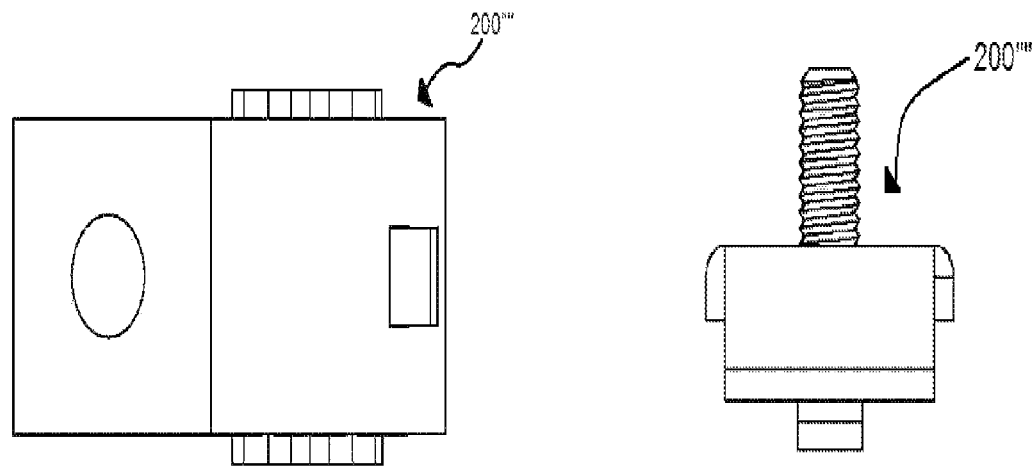
Figure 3:
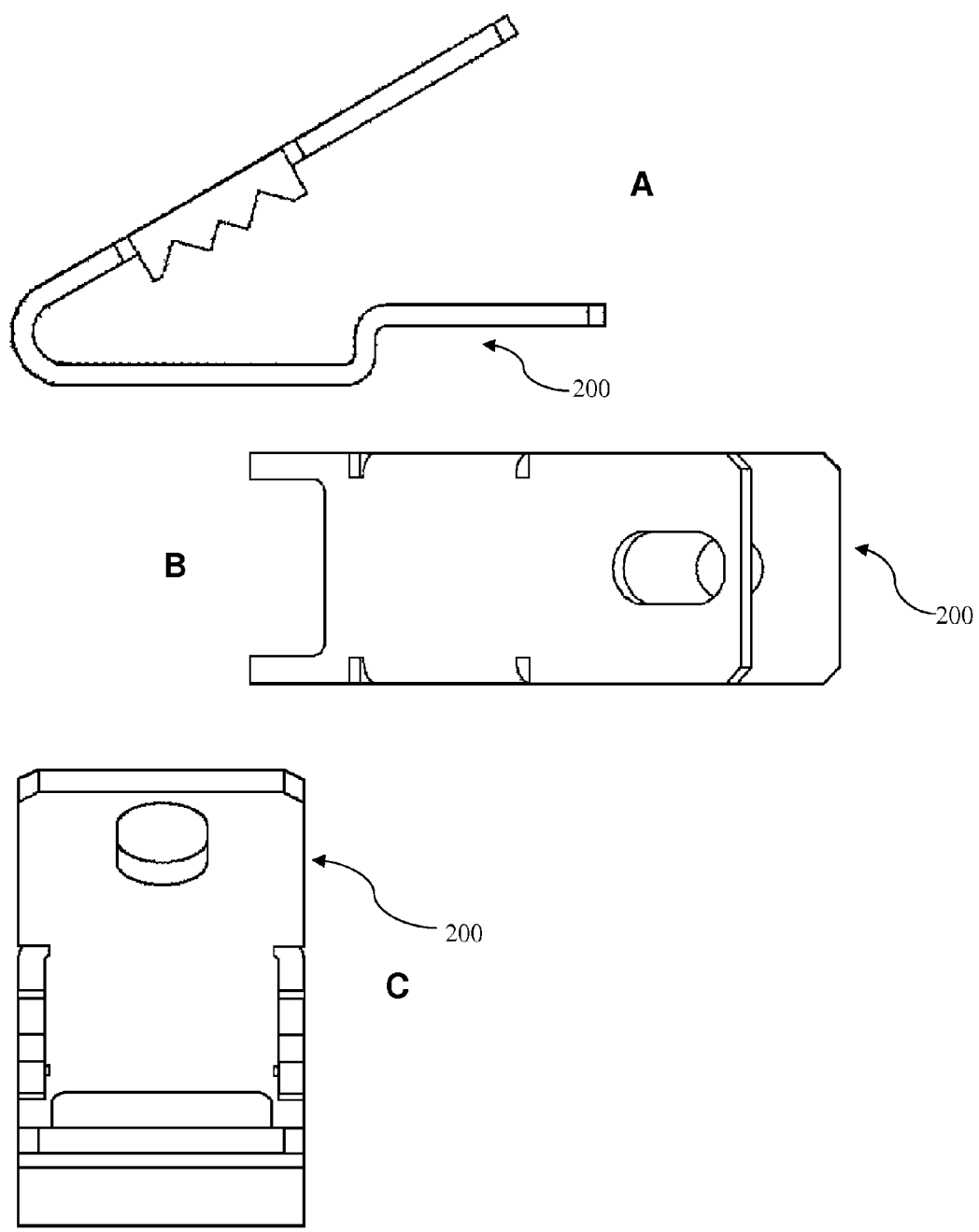
FIG. 3a-c illustrate three perspectives of the bonding clip embodiment of FIG. 2a(A)-2a(B)

Thus, referring again to FIG. 2, the illustrated alternate embodiments of the bonding clip include the embodiment shown in FIG. 2a(A)-2a(B) which has a recessed receiving portion 280 and an fastening portion 290 with a tab on each arm 220, 240 having apertures therethrough and bolt inserted through the aperture of one arm 220, and a set of teeth-like structures 300 on one arm 220 and extending within the receiving portion 280. FIG. 3a-c provide further views of the bonding clip embodiment of FIG. 2a(A)-2a(B).

Figure 4:
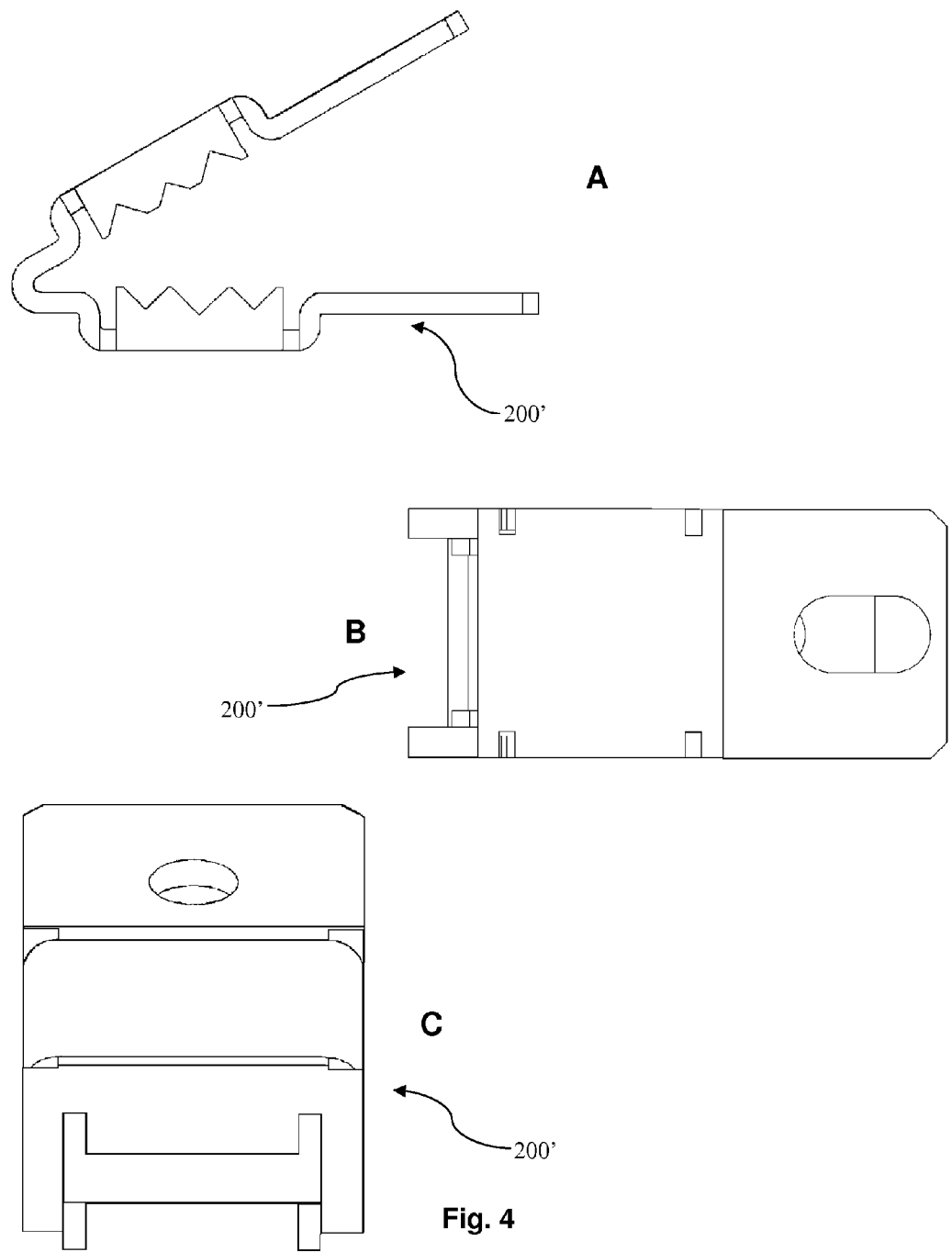
FIG. 4a-c illustrate three perspectives of the bonding clip embodiment of FIG. 2b(A)-2b(B)

The embodiment shown in FIG. 2b(A)-2b(B) has a recessed receiving portion 280 and a fastening portion 290 with a tab on each arm 220, 240 having alternately shaped apertures therethrough and bolt inserted through the aperture of one arm 220, and a opposing sets of teeth-like structures 300 on each arm 220, 240 extending within the receiving portion 280. FIG. 4a-c provide further views of the bonding clip embodiment of FIG. 2b(A)-2b(B).

Figure 5:
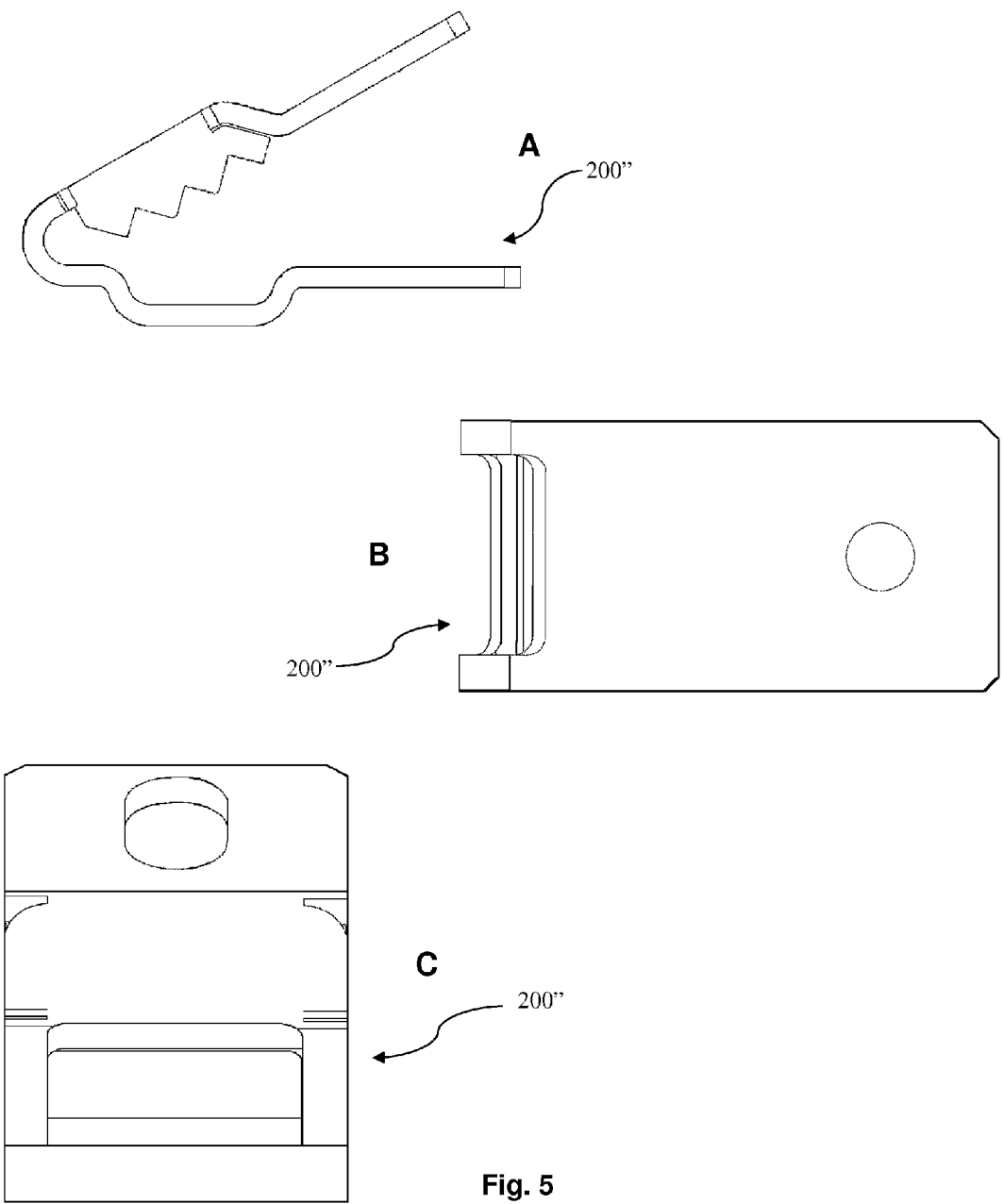
FIG. 5a-c illustrate three perspectives of the bonding clip embodiment of FIG. 2c(A)-2c(B)

The embodiment shown in FIG. 2c(A)-c(B) has a recessed receiving portion 280 and a fastening portion 290 with a tab on each arm 220, 240 having alternately shaped apertures therethrough and bolt inserted through the aperture of one arm 220, and a set of teeth-like structures 300 on one arm 220, the teeth-like structures 300 having a curvature from one end to the other such that the centermost teeth-like structures 300 extending farther within the receiving portion 200 than those on the ends. FIG. 5a-c provide further views of the bonding clip embodiment of FIG. 2c(A)-c(B).

And the embodiments shown in FIG. 2d(A)-2e(B) have arms 220, 240 that are formed of two separate parts and are hingedly connected, and having a receiving portion 280 and a fastening portion 290 on one arm 220 that are coplanar and a receiving portion 280 and fasting portion 290 on the other arm 240 that are not coplanar and a tab on each arm 220, 240 having alternately shaped apertures therethrough and bolt positioned for insertion through the aperture. The arms 220, 240 each may comprise teeth-like structures 300 that extend within the receiving portion 280.

The dimensions of the various bonding clips of the instant invention are readily adaptable to accommodate wires of the various known and standard wire mesh cable tray units, and it would be clear to one of ordinary skill that the specific longitudinal dimensions, as well as the thicknesses and widths of the bonding clips could be varied so long as they would be capable of engagement with known and standard wire mesh trays. Likewise, it would be clear that the specific shape and number of apertures formed within the fastening portions of the bonding clips could be varied so as to accommodate known and standard fasteners of varying sizes. And further, the number and shapes of the teeth-like structures could be varied. according to what is known in the art regarding such structures so long as the teeth-like structures are sufficient in rigidity to scrape or pierce the coatings on mesh wires.

EXAMPLES

In one embodiment, a bonding clip 200 can have any overall length of about 1.72 inches (or about 43.72 mm), an overall width of about 0.98 inches (or about 24.81 mm).

In another embodiment, a bonding clip 200 can have two apertures on its external surface and an overall length of about 1.722 inches (or about 43.73 mm), and an overall width of about 0.977 inches (or about 24.81 mm).

In yet another embodiment, a bonding clip 200 can have three apertures on its external surface, an overall length of about 1.7 inches (or about 43.72 mm), and an overall width of about 0.98 inches (or about 24.81 mm).

Figure 6:
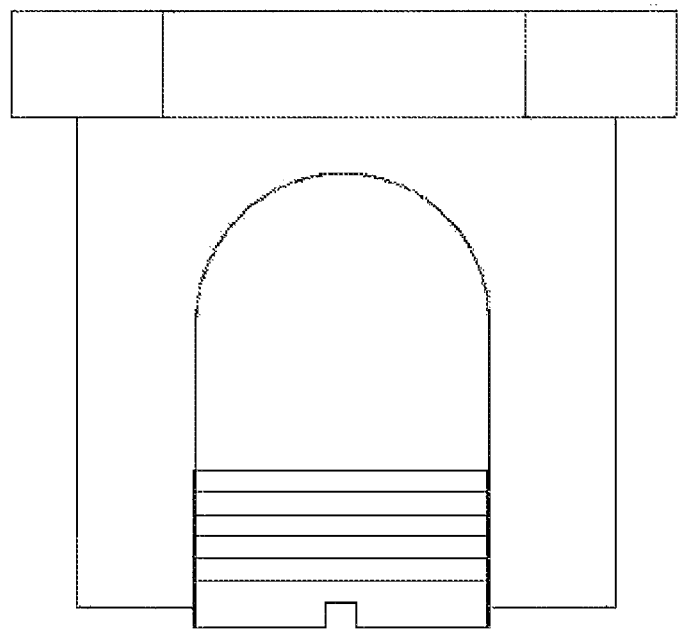
FIG. 6 illustrates an embodiment of a grounding lug.
Figure 6:
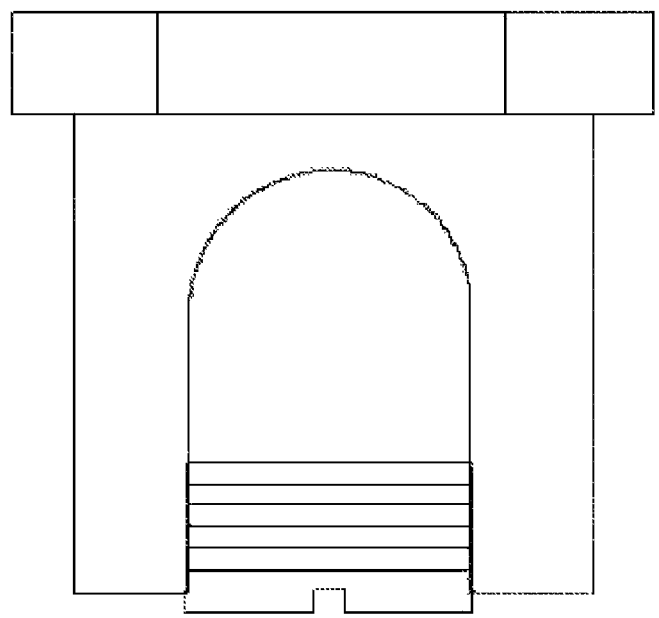

In still another embodiment, a bonding clip 200 can provide a threaded stud to hold a grounding lug, as shown in FIG. 6 which then can be used to allow the wire mesh cable tray to be used for large ampere applications as defined in section 392 of the National Electrical code Table 392.7(B). In one embodiment, the grounding lug can be hexagonal in shape and can have a diameter of about 0.94 inches (or about 23.88 mm) with an interior diameter of about 0.236 inches (or 6 mm) with an height of about 1.02 inches (or about 26 mm) as illustrated in FIG. 6A.

In another embodiment, the grounding lug can be hexagonal in shape and can have a diameter of about 0.815 inches (or about 20.70 mm) with an interior diameter of about 0.236 inches (or 6 mm) with an height of about 0.883 inches (or about 22.45 mm) as illustrated in FIG. 6B.

In still another embodiment, a bonding clip 200 can have any overall length of about 1.87 inches (or about 47.6 mm), an overall width of about 0.98 inches (or about 24.8 mm).

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A bonding clip for assembling in series at least a first and a second cable tray unit each constituted by a mesh of longitudinal and transverse wires and each having end zones, the bonding clip comprising:

two longitudinally opposing arms that define between them a longitudinal slot and that are attachable to one another at least at one connection point and which are movable relative to one another such that the internal dimension of the slot decreases as the arms are moved toward one another, each arm comprising at least one receiving portion for contacting and retaining a plurality of wires between the two arms, and each arm also comprising at least one fixation portion for fixing and locking the arms together, wherein:

the receiving portion of at least one of the opposing arms comprises a plurality of electrically conductive teeth-like structures having dimensions sufficient to at least partially or completely traverse the internal dimension of the slot when the arms are moved toward one another;

the bonding clip has a substantially flat profile such that when attached to the cable tray units, the bonding clip fits within the cross-sectional area of the cable tray units; and the bonding clip is configured to permit maintenance of the cross-sectional areas formed by the wires of the cable tray units in order to meet Equipment Grounding Conductor (EGC) requirements.

2. A bonding clip according to claim 1, wherein the bonding clip has the general form of a clamp with the arms attached to one another at a connection point at one end, and wherein the receiving portion is positioned proximate to the connection point between the arms and the at least one fixation portion is located at a longitudinally spaced apart position relative to the connection point.

3. A bonding clip according to claim 2, wherein the first and second arms are integral with the bonding clip which is of one piece construction.

4. A bonding clip according to claim 3, wherein the connection point is comprises a living hinge.

5. A bonding clip according to claim 1, wherein the first and second arms are separate pieces, the bonding clip being of at least two piece construction.

6. A bonding clip according to claim 5, wherein the first and second arms are attachable at two or more connection points with the receiving portion positioned between at least two of the connection points.

7. A bonding clip according to claim 6, wherein the first and second arms are hingedly connected.

8. A bonding clip according to claim 1, wherein the at least one fixation portion comprises tabs on each of the first and second arms that align when the arms are moved toward one another such that a fastener may be attached thereto.

9. A bonding clip according to claim 8, wherein the fixation portion tabs comprise aligning apertures for receiving a fastener therethrough.

10. A bonding clip according to claim 9, wherein the bonding clip comprises two connection points, one at each end of the longitudinal arms with the receiving portion positioned therebetween, and wherein one such connection point comprises tabs on each of the first and second arms that align when the arms are moved toward one another such that a fastener may be attached thereto.

11. A bonding clip according to claim 10, wherein the bonding clip is formed of two parts, and wherein the first connection point is a hinge and the second connection point comprises apertures in the tabs for receiving a fastener.

12. A bonding clip according to claim 1, wherein the receiving portion of the bonding clip has a longitudinal length which is sufficient to accommodate at least one wire each from each of two adjacent tray units.

13. The bonding clip according to claim 1, wherein the receiving portion on each arm is not coplanar with the fixture portion.

14. A bonding clip according to claim 12, wherein the receiving portion of the bonding clip has a longitudinal length which is sufficient to accommodate at least two wires from one of two adjacent tray units.

15. A bonding clip according to claim 1, wherein at least a portion of the bonding clip comprises an electrically non-conductive coating.

16. A bonding clip according to claim 15, wherein the teeth-like structures do not comprise an electrically non-conductive coating.

17. A bonding clip according to claim 1, wherein the receiving portion of at least one arm comprises three teeth-like structures.

18. A bonding clip according to claim 1, wherein the receiving portion of each arm comprises two or more teeth-like structures.

19. A bonding clip according to claim 18 wherein the teeth-like structures on the opposing arms interdigitate.

20. A bonding clip according to claim 1, wherein the teeth-like structures are formed as at least one linear row selected from a row positioned along one edge of the receiving portion of one arm, a pair of rows positioned along both edges of the receiving portion of at least one arm, at least one row positioned on the contact surface between the edges of the receiving portion of at least one arm, and combinations of these.

* * * * *